Nov. 20, 1951  R. E. CONNER  2,575,944

CHECK VALVE

Filed May 1, 1946

INVENTOR
RALPH E. CONNER
BY EmHarrington
ATTORNEY

Patented Nov. 20, 1951

2,575,944

UNITED STATES PATENT OFFICE 2,575,944

CHECK VALVE

Ralph E. Conner, St. Louis, Mo.

Application May 1, 1946, Serial No. 666,389

3 Claims. (Cl. 277—44)

This invention relates generally to valves and more specifically to check valves adapted particularly for use as repair parts in structures, such, for instance, as electric refrigerators, where inaccessible valve seats become worn in the use of the structures and it is desired to restore the structures to efficient operating condition without returning said structures, or parts thereof, to the factory, where the worn valve seats may be reground with required equipment which is not available in the field, the predominant object of the invention being to provide a check valve of this type which is of extremely simple and inexpensive construction and which will perform its intended function in a highly efficient manner.

Figure 1:
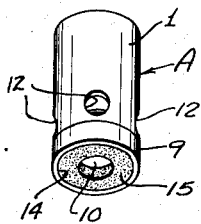
Fig. 1 is a perspective view of the improved check valve.
Figure 2:
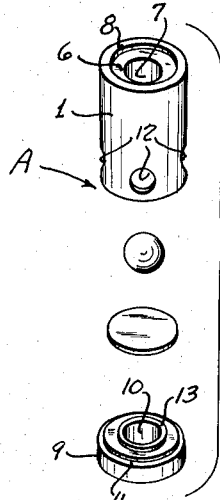
Fig. 2 is a bracketed perspective view showing the parts of the valve illustrated in Fig. 1 in a separated and disassembled condition.

In the drawing, wherein is shown for purposes of illustration, merely, one embodiment of the invention, A designates the improved check valve generally. The check valve A comprises a housing 1 which is of cylindrical shape, said housing having an annular side wall provided with an upper portion 2 of substantial thickness and a lower portion 3 of greatly reduced thickness, an outwardly and downwardly inclined, annular wall 4 being present at the junction of the thicker and thinner portions 2 and 3 of said side wall of the valve housing 1. A cavity 5 is provided within the upper portion of the valve housing 1, and said valve housing includes an upper wall 6, through which an opening 7 is extended, said opening 7 being slightly smaller in diameter than the cavity 5 and communicating with said cavity. Also, at its top the valve housing 1 is provided with an annular flange 8 which serves a purpose to be hereinafter set forth.

Associated with the valve housing 1 at the bottom thereof is a member 9 which also is of cylindrical formation, said member having an opening 10 formed therethrough. The side wall of the member 9 has an annular recess 11 formed therein at the top thereof and this recess receives the lower portion of the thin walled portion of the side wall of the valve housing, as shown to good advantage in Fig. 3. The vertical wall of the annular recess 11 of the member 9 is tightly engaged by the lower portion of the inner face of the lower thin walled portion 3 of the valve housing 1, and the bottom edge of said thin walled portion 3 abuts against the horizontal base of said recess 11 so that said member 9 is, in effect, constituted a fixed part of the valve housing, as is shown in Fig. 1. Also, a plurality of circumferentially spaced apertures 12 are formed through the thin walled portion 3 of the valve housing 1.

At its top the member 9 is provided with an upstanding, annular valve seat 13, and at the bottom of said member a recess 14 is formed therein which receives an apertured gasket 15 formed of suitable yieldable material. The valve seat 13 receives in contact therewith a valve closure element 16 which is in the form of a disk, and disposed above said valve closure element is a ball which is adapted through action of gravity to force the valve closure element into tight contact with the valve seat 13 so as to close the upper end of the opening 10 formed through the member 9.

Figure 3:
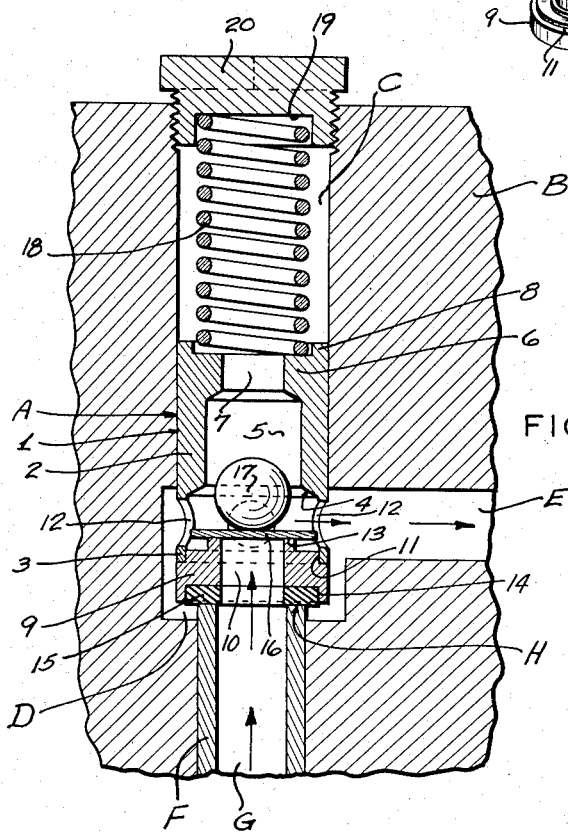
Fig. 3 is an enlarged, fragmentary sectional view showing the improved check valve in place in association with a part of an electric refrigerator.

In Fig. 3 a portion of the structure of an electric refrigerator is shown which comprises a part B in which a vertical opening C is formed which is circular in cross-section. This opening C communicates at its lower end with an opening D of increased diameter, and leading from said opening D is a passageway E which leads to the compressor (not shown) of the refrigerator. Also, the refrigerator structure shown in Fig. 3 includes a tubular element F which provides a passageway G that leads into the opening D, said tubular element being extended upwardly into said opening D to provide an upstanding valve seat H therein.

When the improved check valve disclosed herein is associated with a portion of an electric refrigerator, as illustrated in Fig. 3, the gasket 15 at the bottom of the member 9 of said check valve is forced by a coil spring 18 into close, gas-tight contact with the valve seat H at the top of the tubular element F, said coil spring contacting at its lower end with the upper face of the top wall of the valve housing 1 within the annular flange 8, and the upper end portion of said coil spring being disposed within a cavity 19 formed in a plug 20 which is screwthreadedly seated in the upper portion of the opening C of the refrigerator part B.

When, in the operation of a refrigerator having one of the improved check valves A associated therewith the compressor of the refrigerator is operating, gas passes in the direction of the arrows in Fig. 3 through the passageway G, into the opening D, and from said opening D, by way of the passageway E, to the compressor of the refrigerator, the valve closure element 16 of the check valve A being unseated with respect to the valve seat 13 to permit such passage of gas. Also, when operation of the compressor of the refrigerator is stopped the weight of the ball 17 of the check valve will cause the valve closure element 16 to be seated against the valve seat 13 to hold the vacuum in the vacuum tube of the refrigerator.

Prior to this invention a type of check valve was employed in refrigerators of a particular construction which was so constructed and arranged that the disk closure element of the valve seated directly against the valve seat H, and as a result of this arrangement said valve seat H became worn through continued movement of the disk closure element into and out of contact with the valve seat H. When this happened it was necessary to withdraw the freezing unit from the refrigerator and send it to the factory for regrinding of the valve seat H, due to the fact that special equipment was required to regrind the rather inaccessible valve seat through the opening C. In the use of the check valve A of the present invention, however, it is necessary, merely, to withdraw the old check valve when the valve seat H has become worn, by unscrewing the plug 20 and removing the coil spring 18. One of the improved check valves of the present invention is then introduced into the opening C, wherein it moves downwardly by its own weight to the position occupied by the check valve A in Fig. 3 where the gasket 15 contacts with the valve seat H and the circumferential face of the upper portion of the valve housing 1 contacts closely with a lower portion of the wall of the opening C. The coil spring 18 and the plug are then replaced to provide the assembly shown in Fig. 3, the coil spring forcing the yieldable material of the gasket 15 into tight, gastight contact with the worn valve seat H.

When the valve seat 13 of the member 9 of one of the improved check valves has become worn after long use of the check valve in a refrigerator, the inexpensive member 9 may be replaced by a new member in a few minutes time. If, however, it is desired to regrind the worn valve seat 13, the member 9 may be detached from the valve housing 1, and the completely exposed valve seat 13 may be conveniently and expeditiously reground with the aid of equipment ordinarily possessed by a repair man.

I claim:

1. A check valve comprising a valve housing having a cavity therein, a member detachably supported by said valve housing at an end thereof and having a passageway formed therethrough, a valve seat formed on said member at the top thereof and disposed within said cavity of said valve housing, a valve closure element in the form of a disk which is arranged within the cavity of said valve housing and is adapted to move into and out of contact engagement with said valve seat, a ball disposed within the cavity of said valve housing above said valve closure element whose weight tends to force said valve closure element into contact engagement with said valve seat, valve seat engaging means comprising a gasket associated with said member at the exterior thereof, and a coil spring which engages said valve housing and forces said gasket into tight engagement with respect to its related valve seat.

2. A check valve comprising a valve housing having a cavity therein, a member detachably supported by said valve housing at an end thereof and having a passageway formed therethrough, a valve seat formed on said member at the top thereof and disposed within said cavity of said valve housing, a valve closure element in the form of a disk which is arranged within the cavity of said valve housing and is adapted to move into and out of contact engagement with said valve seat, a ball disposed within the cavity of said valve housing above said valve closure element whose weight tends to force said valve closure element into contact engagement with said valve seat, valve seat engaging means comprising a gasket associated with said member at the exterior thereof, said gasket being disposed in a recess formed in said member, and a coil spring which engages said valve housing and forces said gasket into tight engagement with respect to its related valve seat.

3. A check valve comprising a valve housing having a cavity therein, a member detachably supported by said valve housing at an end thereof and having a passageway formed therethrough, a valve seat formed on said member at the top thereof and disposed within said cavity of said valve housing, a valve closure element in the form of a disk which is arranged within the cavity of said valve housing and is adapted to move into and out of contact engagement with said valve seat, a ball disposed within the cavity of said valve housing above said valve closure element whose weight tends to force said valve closure element into contact engagement with said valve seat, valve seat engaging means comprising a gasket associated with said member at the exterior thereof, said member being provided with a recess formed in the outer surface thereof which receives a wall portion of said valve housing, and a coil spring which engages said valve housing and forces said gasket into tight engagement with respect to its related valve seat.

RALPH E. CONNER.

REFERENCES CITED

The following references are of record in the file of this patent:

UNITED STATES PATENTS

| Number | Name | Date |
|---|---|---|
| 1,167,180 | Hichcock | Jan. 4, 1916 |
| 1,485,544 | Yeiser | Mar. 4, 1924 |
| 1,676,179 | Fleming | July 3, 1928 |
| 1,779,322 | Leidecker | Oct. 21, 1930 |
| 1,889,122 | Hewitt | Nov. 29, 1932 |
| 1,935,899 | Yarnall | Nov. 21, 1933 |
| 1,936,975 | Wasson | Nov. 28, 1933 |